United States Patent [19]
Bishop et al.

[11] Patent Number: 5,629,953
[45] Date of Patent: May 13, 1997

[54] CHALCOGENIDE OPTICAL PUMPING SYSTEM DRIVEN BY BROAD ABSORPTION BAND

[75] Inventors: Stephen G. Bishop, Champaign; Shiqun Gu; Douglas A. Turnbull, both of Urbana, all of Ill.

[73] Assignee: The Board of Trustees of the University of Illinois, Urbana, Ill.

[21] Appl. No.: 435,353

[22] Filed: May 5, 1995

[51] Int. Cl.⁶ .................................................. H01S 3/14
[52] U.S. Cl. .................................. 372/39; 372/40
[58] Field of Search ................................ 372/39, 40, 6

[56] References Cited

U.S. PATENT DOCUMENTS

| | | | |
|---|---|---|---|
| 5,136,677 | 8/1992 | Drexhage et al. | |
| 5,244,846 | 9/1993 | Onishi et al. | 372/6 |
| 5,253,322 | 10/1993 | Onishi et al. | 372/6 |
| 5,299,210 | 3/1994 | Snitzer et al. | |
| 5,309,452 | 5/1994 | Ohishi et al. | 372/6 |
| 5,321,708 | 6/1994 | Tohmon et al. | |
| 5,377,294 | 12/1994 | Onishi et al. | 372/6 |
| 5,388,110 | 2/1995 | Snitzer | 372/6 |
| 5,392,376 | 2/1995 | Aitken et al. | |

OTHER PUBLICATIONS

Gain Flatness Comparison Between Erbium–Doped Flouride and Silica Fiber Amplifiers with Wavelength–MultiplexedSignals, B.Clesca, B.Ronarc'h, D.Bayart, Y.Sorel, L. Hamon, M.Guilbert, J.L.Beylat, J.F.Kerdiles and M.Semenkoff, IEEE Photonics Technology Letters, vol. 6, No. 4, Apr. 1994.

Iron impurities as non–radiative recombination centres in chalcogenide glasses, S.G. Bishop and P.C.Taylor, Philosophical Magazine B, no month 1979, vol. 40, No. 6, 483–495.

Photoluminescence and Excitation Spectroscopy in Er:As S Glass, S.Q.Gu, Q.Xu, E.E.Reuter, J.T. Verdeyen, and S.G.Bishop, IEEE Lasers and Electro–Optics Society 1993 Annual Meeting, (LEOS), Nov. 15–18, 1993.

*Primary Examiner*—Rodney B. Bovernick
*Assistant Examiner*—Robert E. Wise
*Attorney, Agent, or Firm*—Greer, Burns & Crain, Ltd.

[57] ABSTRACT

The present invention concerns an optical pumping system making use of a broad continuous absorption band in rare earth doped chalcogenide glasses. The absorption band is approximately 400 nm in width and extends from approximately 600 nm to 1000 nm. Through subjecting the glass to pumping light from an excitation source within the broad absorption band, photoluminescence emissions are produced. Size and strength of the pumping absorption band are such that great flexibility is provided in implementation of the excitation source. Specific embodiments of4 the present invention may utilize Er or Pr doped $Ge_{33}As_{12}S_{55}$ or $As_2S$. Selection of the chalcogenide host may adjust the broad absorption band. As an example, a narrower gap chalcogenide glass, such as $Ge_{28}Sb_{12}Se_{60}$, should extend the broad absorption band into the 1064 nm wavelength. Lasers, optical amplifiers and other devices may be realized in accordance with the pumping system of the present invention, and the chalcogenide glass may be formed as a thin film combined on a substrate with a semi-conductor laser.

32 Claims, 3 Drawing Sheets

CHALCOGENIDE OPTICAL PUMPING SYSTEM DRIVEN BY BROAD ABSORPTION BAND

This invention was made with Government support under Contract No. ECR 89-43166 awarded by the National Science Foundation. The Government has certain rights in the invention.

The present invention relates generally to an optical pumping system using a broad band pumping mechanism which allows great flexibility as to implementation of excitation sources. More specifically, the present invention concerns a pumping system in which light from an excitation source is absorbed by a rare earth doped chalcogenide glass over a continuous broad absorption band to excite photoluminescence emissions.

BACKGROUND OF THE INVENTION

Transmission of electrical and optical signals may be effectively used to communicate information. Microwave signals are electrical emissions transmitted through the air to carry audio and visual information over distance. Similarly, electrical signals may be transmitted over cables, as is done in telephone systems and cable television systems.

Recently, in communications systems, such as telephone systems, emphasis has turned toward use of optical signals and away from use of electrical signals. In modern times, telephone companies implement optical fiber communication systems. In the home electronics industry phonographs have been replaced with compact disk players, which rely upon laser light reflections to read information from a disk.

Practical reasons exist for the shift in focus to optically driven systems. Unlike electrical signals, optical signals are generally unaffected by electromagnetic fields created by such things as power lines, lightning and even sunspots. These sources of interference may create noise in electrical signals. Noise may appear, for instance, as static in an audio signal or distortion in a visual signal. Thus, while such electromagnetic fields create noise in a electrical communication system, an optical system retains its original qualities in the presence of the electromagnetic fields.

Information capacity of optical signals is also much larger than lower frequency electrical signals that are used in wire and wireless communication systems. Generally, higher frequency signal carriers provide larger information capacity than lower frequency signal carriers. This is due to the wider bandwidth of the higher frequency signals.

Larger information capacity and noise immunity are great benefits, but another important benefit of communicating with optical signals is the small size of optical fibers used as a transmission medium. A typical fiber having hair sized dimensions is a suitable replacement for bundles of copper wires having much larger diameter. As demands for information access become larger and larger in modern times, the use of optical transmission systems places less demand on space in the construction of underground, above ground, and internal building communication systems.

Common difficulties are encountered in the practical implementation of optical communication systems, however. Ideally, the basic elements of a communication system include a transmitter, a transmission medium, and a receiver. Input signals, typically electric signals, are input to an optical transmitter. Conversion of the input signal to an optical signal is conducted within the transmitter and a light source, such as a semiconductor laser, pumps light into the optical transmission medium. The transmission medium usually takes the form of an optical fiber. Reception and conversion of the optical signal is accomplished in a receiver coupled to the optical fiber at some distance away from the transmitter. A basic receiver will include a light detector for detecting the optical signal and converting the same to an electrical signal, an amplifier for amplifying the electrical signal, and signal reproducer for outputting the original input signal as an electrical signal.

In practice, additional elements are required since signal losses occur over distance in the optical fiber. Losses limit the distance by which the transmitter and receiver may be separated. These losses are generally referred to as optical signal attenuation. Absorption of signal light by the fiber acting as the transmission medium is one factor causing attenuation. Other factors leading to attenuation are the scattering of the signal light over a wider wavelength than the original transmission and radiative losses, typically occurring at bends in the optical fiber. Combination of these individual losses leads to a total signal attenuation characteristic for a particular optical transmission medium which is measured in decibels per kilometer.

In order to implement practical systems, taking into consideration the optical attenuation characteristic of the particular optical fiber being used, it is therefore necessary to periodically amplify the signal as it travels over distance. Repeater stations are used to accomplish this amplification and are an integral part of modern optical communication systems. Typical repeater stations include both a receiver and transmitter which decode the optical signal, convert it to an electrical signal, reconvert to an optical signal and transmit the optical signal toward the next repeater or receiver station.

Repeater stations contribute significantly to the cost of optical communication systems, commonly costing tens of thousands of dollars. Moreover, repeater stations are provided in redundant pairs or larger numbers of repeaters, since a repeater may fail. Additionally, the repeater stations are often installed in inconvenient locations, such as the ocean floor, that makes replacement and initial installation difficult and expensive.

A simpler manner of implementing repeater stations involves use of optical amplifiers. The general structure of an optical amplifier is detailed in U.S. Pat. No. 5,309,452 to Ohishi et al., which is hereby incorporated by reference. In an optical amplifier, the signal light is amplified in optical form without conversion to an electrical signal. Amplification is accomplished by stimulating the signal with additional photoluminescence as it passes through the optical amplifier. Of course, the optical amplifier has other applications, including implementation at the transmission end of an optical communication system to create stronger optical signals that may travel further in a fiber having given attenuation characteristics.

Additional photoluminescence is attributable to what is commonly referred to as a pumping mechanism. Signal light of a given frequency enters the optical amplifier, which is composed of glass or other transmissive material. Glass in the amplifier is also subjected to pumping light from an excitation source which the glass absorbs and which stimulates additional photoluminescence emissions in the amplifier that are imparted to the optical signal. Gain is realized when excitation source light is absorbed and the resulting photoluminescence emissions from the glass coincide with the wavelength of the optical signal.

Traditionally, the optical amplifiers and transmission mediums have been formed with oxide glasses. A widely applied amplifier using oxide glass is the Erbium doped fiber amplifier (EDFA). More recently, chalcogenide glasses have been investigated as hosts since these glasses have good infrared wavelength transparency, are durable, are easy to prepare in bulk or thin film form, and may be formed as patterned waveguides by photodarkening processes. The ability to create chalcogenide thin films, by sputtering, for instance, allows for formation of a device using a chalcogenide glass as part of a larger semi-conductor integrated package.

Typical EDFA's rely exclusively upon the pumping absorption and emission characteristics attributable to the dopant, i.e. Erbium (Er). Effective absorption of light from the excitation source by the EDFA requires that the excitation light correspond to narrow characteristic absorption bands of the Erbium dopant. Incident light in these bands will excite electrons of Erbium ions within the glass to higher energy levels, and photons are released to provide luminescence when the electrons return to the normal state. In EDFA's pumping is therefore limited to the narrow absorption peaks corresponding to the $Er^{3+}$ energy level transitions, at 810 nm (the $^4I_{15/2} \rightarrow {}^4I_{9/2}$ transition), 980 nm (the $^4I_{15/2} \rightarrow {}^4I_{11/2}$ transition) and 1480 nm (the $^4I_{15/2} \rightarrow {}^4I_{13/2}$). These absorptions result in photoluminescence emissions in a small band near 1550 nm as excited electrons return to a normal state during the $^4I_{13/2} \rightarrow {}^4I_{15/2}$ radiative transition. For these reasons, precision excitation sources, such as wavelength tailored semiconductor lasers, must be confined to those narrow absorption peaks. Such sources may be expensive and difficult to produce since fabrication techniques and tolerances must insure that the source emit light at the narrow absorption peak. Additionally, use of broader band sources, such as light emitting diodes, is not effective since the majority of excitation light produced falls outside of those absorption peaks.

In an effort to expand the strictly constrained absorption techniques, other dopants may be introduced along with or in place of the Erbium, as discussed in Ohishi et al., U.S. Pat. No. 5,309,452. For instance, the use of other dopants, such as Ytterbium and Praseodymium may modify the absorption characteristic as these dopants also have characteristic absorption transitions. Additionally, chalcogenide and other hosts are also contemplated. However, excitation sources are still tuned to the particular absorption peaks of the utilized dopants, and the aforementioned absorption pumping limitations still apply. In other words, since the narrow peak absorption transitions of the dopants are relied upon, the excitation sources are still subject to the similar constraints as the EDFA's.

Outside of amplification applications, reliance on the absorption transition peaks attributable to the dopants also limits utility. Exemplary is application of a doped glass as an optical detector. Since emissions of a given wavelength occur in response to characteristic absorption transitions of the dopants, monitoring of the particular wavelength will indicate whether or not the glass is subject to incident light of those particular wavelengths. However, the discrete absorption peaks correspond to a small region of detection. Artisans will also recognize the limitations placed upon other applications which rely upon the discrete and narrow absorption peaks of dopants introduced into a glass host.

In sum, there is a need for an optical pumping system having broad band continuous absorption characteristic which allows for great flexibility in the excitation source used while providing good photoluminescence emission characteristics.

It is therefore an object of the present invention to provide an improved optical pumping system that uses an absorption band extending beyond characteristic dopant absorption transitions.

Another object of the present invention is to provide an improved optical pumping system responsive to excitation pumping light over a continuous broad absorption range of approximately 400 nm.

Still another object of the present invention is to provide an improved optical pumping system which can utilize excitation sources, such as light emitting diodes and simple semiconductor lasers, that supply pumping light over a broader spectrum than finely tuned and expensive laser sources.

An additional object of the invention is to provide an improved optical pumping system having a chalcogenide glass doped with a rare earth which absorbs excitation light from an excitation source over an approximate wavelength band of 600–1064 nm.

A further object of the present invention is to provide an improved optical pumping system having a chalcogenide glass and a rare earth dopant in which characteristic absorption peaks of the rare earth dopant are superimposed on a broad absorption band of approximately 400 nm in width.

A still further object of the present invention is to provide an improved optical pumping system having a chalcogenide glass doped with a rare earth responsive to an excitation source, the glass having a broad absorption band and being suitable for thin film deposition in an integrated circuit including the excitation source.

Yet another object of the present invention is to provide an improved optical pumping system having a chalcogenide glass doped with Erbium or Praseodymium, or both, the chalcogenide glass absorbing pumping light from an excitation source over a broad absorption band of approximately 400 nm in width.

A still additional object of the present invention is to provide an improved optical pumping system having a rare earth doped chalcogenide glass in which electrons are excited to a higher energy level in response to excitation source light over a broad absorption range of approximately 400 nm in width, the electrons having higher energy level occupancy lifetimes in the approximate range of 0.25 ms (Praseodymium) to 2 ms (Erbium).

SUMMARY OF THE INVENTION

The present invention relates to an improved optical pumping system utilizing a continuous broad absorption band of approximately 400 nm in width. According to the present invention a chalcogenide glass including a rare earth dopant produces radiative emission in response to absorption of pumping light supplied from an excitation source. A broad absorption band of the doped chalcogenide glass extending from approximately 600 nm to 1064 nm is used as the excitation source spectrum. Absorption is strong over the entire range, and a wide peak is exhibited in the range near 700 nm. Erbium and Praseodymium are used as dopants in accordance with a particular embodiment of the present invention to dope glasses such as $As_2S_3$ and $Ge_{33}As_{12}Se_{55}$, but other chalcogenides doped with rare earths may be used to practice the present invention. The rare earth dopants are introduced in the process of fabricating the glass from the melt. This process of melting and rocking the host materials and dopants in quartz ampoules also introduces unintentional impurities such as iron and oxygen which result in the broad absorption band.

In accordance with an aspect of the present invention the pumping system may include an optical signal generator, a transmission medium and an optical amplifier, the amplifier having a chalcogenide glass doped with a rare earth and responsive to a broad band of excitation light from an excitation source to amplify optical signal light. The chalcogenide glass adds stimulated emission to the optical signal. Flexibility is provided by the broad absorption band since the excitation source may subject the glass to pumping light anywhere within the continuous broad range. Implementation of the excitation source may be accomplished, for instance, with a semiconductor laser or a light emitting diode having an emission band which encompasses multiple wavelengths within the continuous broad range.

Another aspect of the invention relates to the implementation of an optical pumping system having a rare earth doped chalcogenide glass combined onto an integrated circuit with an excitation source which subjects the chalcogenide glass to pumping light over a broad continuous absorption band. Preferably the chalcogenide glass is formed as a thin film by standard techniques such as sputtering or thermal evaporation. The rare earth dopants are introduced in the sputtering target or in the source material for evaporation.

Good electron radiative lifetimes are realized through the present invention. Electrons within the chalcogenide glass excited through broad band absorption of pumping light remain in an excited state for an approximate time of 0.25 for Praseodymium to 2 ms in Erbium for concentration up to 0.2 wt. %.

BRIEF DESCRIPTION OF THE DRAWINGS

Other features, advantages and objects of the invention will be readily apparent to those skilled in the art by reference to the detailed description and drawings, of which.

DETAILED DESCRIPTION OF THE INVENTION

Broadly stated, the present invention provides an improved optical pumping system making use of a continuous broad absorption band of a rare earth doped chalcogenide glass. The chalcogenide glass incorporated into an optical pumping system in accordance with the present invention produces photoluminescence emissions in response to excitation light anywhere within a continuous absorption range of approximately 400 nm in width. Excellent oscillator strength is encompassed within the broad absorption band and high efficiency pumping may be realized.

Figure 1:
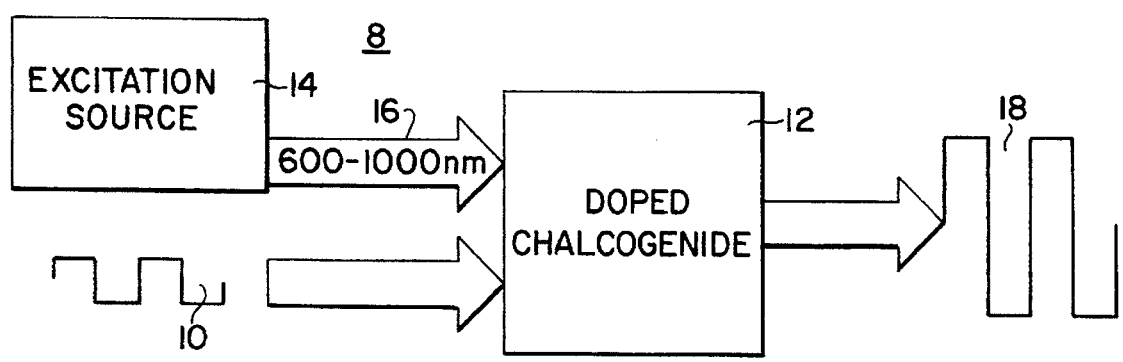
FIG. 1 is block diagram of an optical pumping system constructed in accordance with the principles of the present invention.

Referring now to FIG. 1, shown is a basic optical pumping system 8 in accordance with the present invention. An optical signal 10 carrying information is directed into a rare earth doped chalcogenide glass 14. Optical signal 10 may originate from a transmitter, for instance, and may have travelled some distance from the transmitter through a transmission medium, an example of which is an optical fiber.

As is well understood in the art, as the optical signal 10 travels through a transmission medium signal losses referred to as attenuation, may occur. Eventually, the losses reach a level wherein the information carried by the optical signal may no longer be discernable by an optical receiver intended to decode the signal. Alternatively, the optical signal may be emitted from a relatively weak transmitter in which case it is desirable to amplify the signal even before the signal has been transmitted over distance.

In either situation, and other situations, it is desirable to amplify the optical signal 10. Addressing this goal, the optical signal 10 to be amplified is directed into the rare earth doped chalcogenide glass 14, which may be in fiber or thinfilm form. Any suitable coupling or light guide may be used to direct the optical signal 10 into the chalcogenide glass 14. Also directed into the chalcogenide glass 14, from an excitation source 16, is excitation (pumping) light 16.

Pumping light 16 directed into the chalcogenide glass anywhere within an approximate continuous wavelength band from 600 to 1000 nm is absorbed by the glass. This broad absorption mechanism excites rare earth dopant atoms into higher energy levels from which they can relax by the emission of photons having a characteristic wavelength (e.g. 1550 nm for Erbium), and a characteristic spontaneous radiative lifetime. If the rate of excitation (pumping) exceeds the spontaneous emissions rate, a population inversion is achieved. Incident photons (the optical signal) at the emission wavelength can then stimulate additional photons of identical wavelength and phase (stimulated emission) effecting an amplification of the optical signal. An amplified optical signal 18 propagates from the chalcogenide glass and may be directed into a transmission medium, a receiver, an additional pumping system or other useful device.

Advantageously, the excitation source need not be tuned to a narrow emission frequency, such as the 980 nm frequency typically used for pumping in the Erbium doped fiber amplifiers. Flexibility is thus provided in physical implementation of the excitation source which may take the form, for instance, of a semiconductor laser or light emitting diode with a broad emission output. Additionally, outputs of multiple lasers or other sources having pumping light emissions falling anywhere within the absorption range of the chalcogenide glass 12 may be simultaneously utilized as an excitation source.

The directional scheme of pumping depicted in the pumping system 8, in which pumping light 16 and the optical signal 10 enter the same end of the chalcogenide glass, is commonly referred to as co-propagating pumping scheme. As will be understood by those in the art, a counter propagating scheme (in which the signal and pumping light enter from opposite ends) or a multiple propagating scheme (in which pumping light enters from both ends) may also be utilized.

Optical signal 10 may be of the commonly used 1.3 or 1.5 μm bands, but a range of other wavelengths will also be amplified through absorption stimulated emissions. A broad emission range from approximately 1510 nm to 1700 nm is realized with co-doping using Er and Pr.

Figure 2:
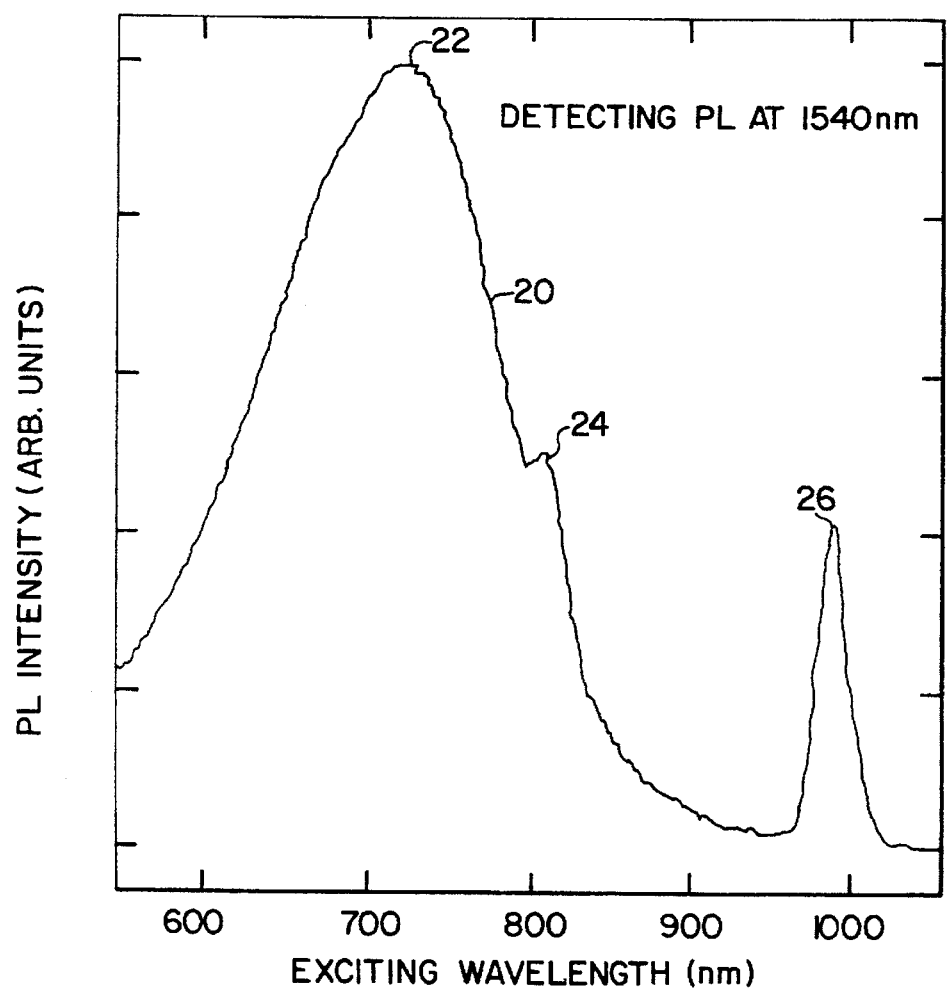
FIG. 2 is a room temperature photoluminescence excitation (PLE) spectrum obtained from a 0.2% wt. Er:$Ge_{33}As_{12}Se_{55}$ sample, which may be utilized as the doped chalcogenide in the system of FIG. 1, and which was subjected to excitation light over a range of wavelengths, wherein the photoluminescence emissions from the sample were detected at 1540 nm.

Referring now to FIG. 2, the broad band absorption spectrum utilized in the pumping system of the present invention will be described in more detail. FIG. 2 shows a room temperature plot of photoluminescence excitation spectrum detected at 1540 nm. Data for the plot was obtained by subjecting a bulk sample of 0.2% Wt. Er:$Ge_{33}As_{12}Se_{55}$ glass to tunable excitation light provided by a tungsten lamp dispersed by a 0.25 m double grating monochromator.

In the plot of FIG. 2, photoluminescence intensity is expressed in arbitrary units while the excitation wavelengths are expressed in nanometers. Readily apparent from the plot is the continuous broad band absorption spectrum followed by the curve 20 and utilized in the pumping system of the present invention. The band includes a maximum absorption peak centered at approximately 700 nm, with smaller peaks 24 and 26 superimposed upon the broad band and attributable to the 810 nm ($^4I_{15/2} \rightarrow {^4I_{9/2}}$) and 980 nm ($^4I_{15/2} \rightarrow {^4I_{11/2}}$) $Er^{3+}$ absorption transitions, respectively. Preferably, pumping is conducted in the stronger part of the curve 20 to increase efficiency, but pumping is possible throughout the band from approximately 600 nm to 1000 nm. Moreover, since the entire band as well as the maximum peak 22 are broad, flexibility is provided in the design and physical construction of the excitation source used to stimulate emissions. Efficient pumping may be realized even without a precisely tuned excitation source locked onto the characteristic absorption transitions attributable to the rare earth dopant. Another chalcogenide glass, $As_2S_3$, doped with Erbium also produces similar results to those obtained with $Ge_{33}As_{12}Se_{55}$. Comparison to Er doped oxide glass supports the proposition that the absorption mechanism is attributable to unintentional or background impurities and defects in the host chalcogenide glass during the melting of the constituents of the glass.

Figure 3:
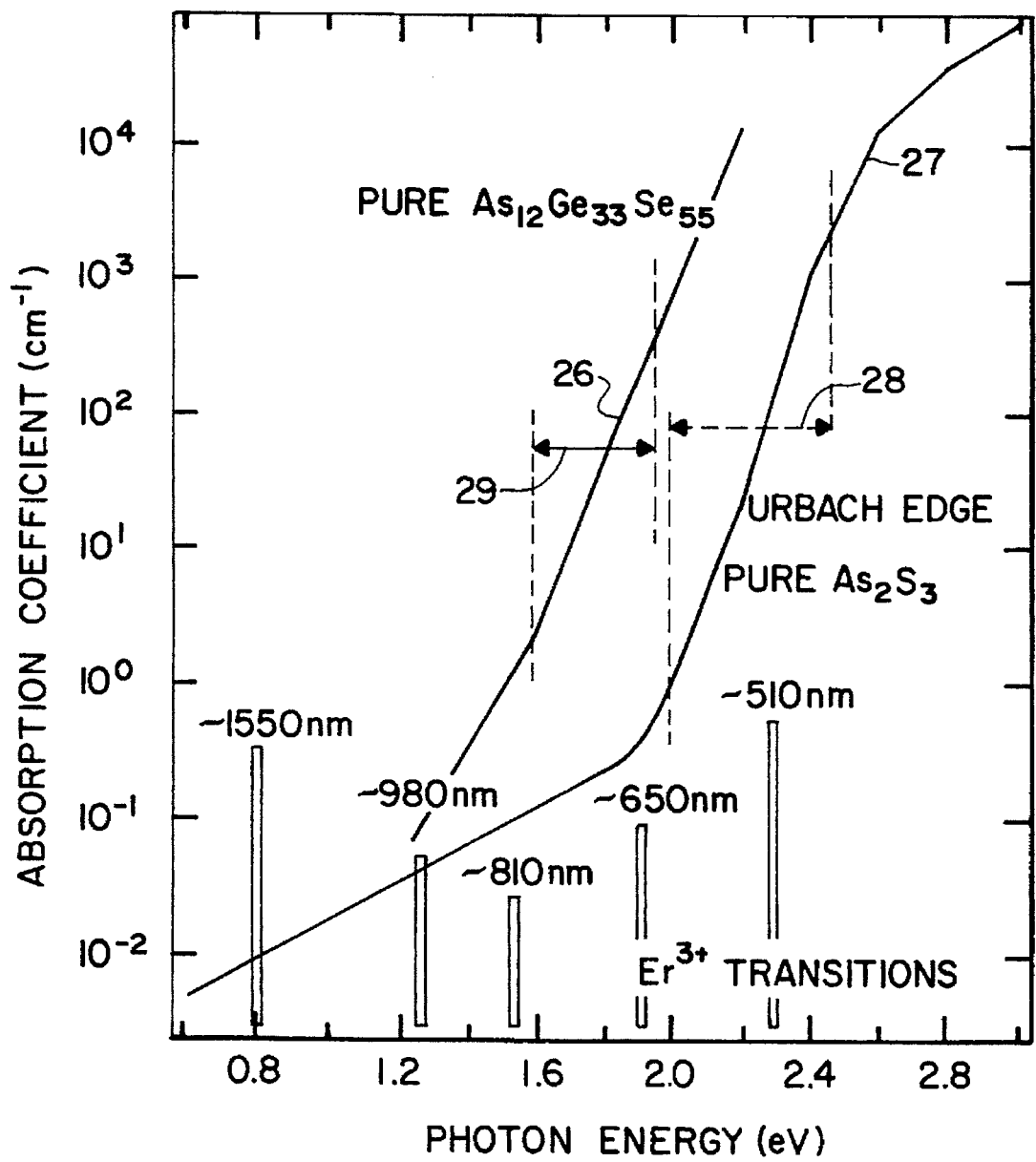
FIG. 3 shows a room temperature absorption band spectra for high purity $Ge_{33}As_{12}Se_{55}$ and $AS_2S_3$ with characteristic absorption/emission bands for $Er^{3+}$.

FIG. 3, a plot of absorption coefficients versus photon energy for pure $Ge_{33}As_{12}Se_{55}$, tracked by curve 26, and pure $As_2S_3$, tracked by curve 27 helps explain the absorption mechanism in the chalcogenide glasses. It should be emphasized that chalcogenide glasses are classified as amorphous semiconductors with band gaps and associated absorption edges in the red or near infrared portion of the spectrum. The room temperature band edge absorption spectra for high purity $Ge_{33}As_{12}Se_{55}$ and $As_2S_3$ glass are shown in FIG. 3 along with the positions of the usual 1550, 980, 810, and 650 nm absorption/emission bands expected for $Er^{3+}$. Like all chalcogenide glasses, the band edge absorption spectra of these glasses are characterized by an exponential Urbach tail, commonly referred to as the Urbach absorption edge (28 and 29 in FIG. 3). At energies below the Urbach edges the absorption decreases with an approximately exponential form but of lower slope. This absorption tail, which extends deep into the gap, is attributed to defects and impurities and its magnitude can be reduced by purification or increased by doping. In contrast, the spectral position and slope of Urbach edge are intrinsic properties of the particular chalcogenide glass, and can only be altered by a significant change in its composition.

As seen in FIG. 3, the weak, low energy absorption tails of the chalcogenide glasses overlap the expected positions of the 1550 nm ($^4I_{15/2} \rightarrow {^4I_{13/2}}$), 980 nm ($^4I_{15/2} \rightarrow {^4I_{11/2}}$), 810 nm ($^4I_{15/2} \rightarrow {^4I_{9/2}}$), and 650 nm ($^4I_{15/2} \rightarrow {^4F_{9/2}}$)$Er^{3+}$ optical transitions. Higher lying $Er^{3+}$ transitions are within or above the Urbach absorption edges of the glasses. The PL and PLE spectra for $As_2S_3$ glass and Er-doped $Ge_{33}As_{12}Se_{55}$ glass demonstrate that this overlap has a profound effect on the PLE spectra and pumping mechanisms for the 1550 NM $Er^{3+}$PL band in chalcogenide glasses. The spectral range of the broad-band, below-gap PLE spectrum of the 1550 nm $Er^{3+}$+Pl band corresponds to the weak absorption of the defect or impurity band tail states, and is terminated at the high-energy end by the onset of the strong Urbach absorption edge. This indicates that energy is transferred from the defect or background impurity band tail states of the chalcogenide glass to the 4F shells of the $Er^{3+}$.

The absorption coefficient in the low energy absorption tails of high purity chalcogenide glasses such as $As_2S_3$ and $Ge_{33}As_{12}Se_{55}$ is known to be quite small (<0.01–0.1 $cm^{-1}$). However, it has been demonstrated previously that the magnitude of the weak absorption tails below the Urbach edge in chalcogenide glasses is dependant upon the concentration of impurities in the glass. In particular, doping of $As_2S_3$ glass with ~120 ppm Fe increased the strength of the mid-gap absorption tail by two orders of magnitude (from 0.01 to 1.0 cm at 1.0 cV). Similarly, the relatively strong exponential PLE band observed in the "band tail" spectral range for the Er-doped $As_2S_3$ and $Ge_{33}As_{12}Se_{55}$ glasses indicates that the Er doping process introduces an additional broad band extrinsic absorption mechanism which efficiently excites the characteristic 1550 nm $Er^{3+}$ emission band.

Bulk samples of the Er-doped chalcogenide glasses were prepared from mixtures of the major constituent elements (arsenic, sulfur, selenium, and germanium) and crystalline $Er_2S_3$. The mixtures were sealed in quartz ampoules, gradually heated (over 25 h) to 850 C. ($As_2S_3$) or 1050 C. ($Ge_{33}As_{12}Se_{55}$) rocked for 70 h, and then slowly cooled over 70 h to room temperatures using a programmable controller. Although the starting materials used in marking the Er-doped glasses are of the highest purity available, the process of melting and rocking the host materials and dopants in quartz ampoules introduces impurities such as iron and oxygen which are drawn from the ampoule into the melt.

The relationship between chalcogenide glass absorption coefficients and the dopant absorption transitions allows modification of the absorption bandwidth used in the pumping system of the present invention. Chalcogenide glasses exhibit generally identical absorption trends to those illustrated in FIG. 3, and line shapes for absorption coefficients of other chalcogenides should follow curves 26 and 27.

Some shifting of the curves should depend upon the exact absorption coefficient plot of the host glass. For instance, a narrower gap chalcogenide glass, such as $Ge_{28}Sb_{12}Se_{60}$, should extend the broad absorption band into the 1064 nm wavelength. That wavelength is characteristic of Nd:YAG pump lasers, which then could be implemented as an excitation source in the pumping system of the present invention. Thus, changing the composition of the host chalcogenide glass and altering the concentration of background impurities will allow some modification of the exact width and placement of the wavelength of the absorption mechanism.

Figure 4:
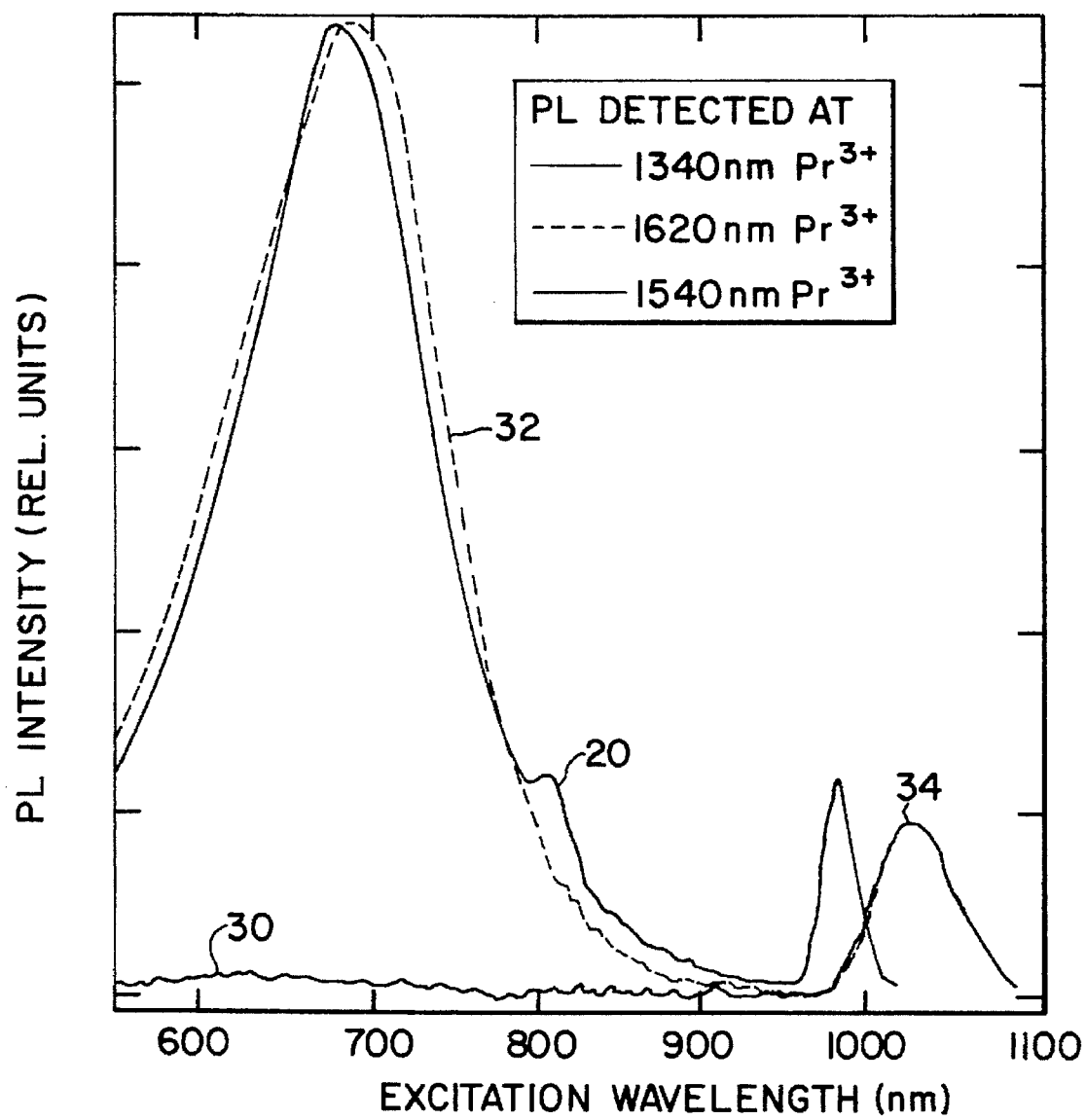
FIG. 4 is a room temperature photoluminescence excitation (PLE) spectrum obtained from a 0.2% wt. Er:$Ge_{33}A_{12}Se_{55}$ and a 0.2 wt. % Pr:$Ge_{33}As_{12}Se_5$ sample, either of which may be utilized as the doped chalcogenide in the system of FIG. 1, and both of which were subjected to excitation light over a range of wavelengths wherein the photoluminescence emissions from the sample were detected at 1340 nm, 1540 nm, and 1620 nm.

Further support that the absorption mechanism relied upon by the pumping system of the present invention is attributable to defect or impurity induced chalcogenide absorption is apparent in FIG. 4. Shown in FIG. 4 is a room temperature photoluminescence excitation spectra for a 0.2% wt. Pr:$Ge_{33}As_{12}Se_{55}$ sample compared with the 0.2% wt. Er:$Ge_{33}A_{12}Se_{55}$ plot of FIG. 2. Excitation light for testing the Pr sample was provided in the same manner as was used to obtain the plot of FIG. 2. The Photoluminescence excitation spectrum of emission at 1540 nm for the Er doped sample is represented by the same curve 20 utilized in FIG. 2. Curves 30 and 32 represent photoluminescence excitation spectra of emissions at 1340 and 1620 nm, respectively, for the Pr doped sample.

The curve 32, which is the photoluminescence excitation spectrum of the 1620 nm ($^3F_3 \rightarrow {}^3H_4$) radiative $Pr^{3+}$ transition, exhibits the same strong, broad absorption band as the curve 20. In contrast, the curve 30, which is photoluminescence excitation spectrum of the 1340 nm ($^1G_4 \rightarrow {}^3H_5$) radiative $Pr^{3+}$ transition, exhibits almost no broad peak, although it does show peak 34 at approximately 1040 nm, which is attributable to an absorption transition ($^3H_4 \rightarrow {}^1G_4$) of the $Pr^{3+}$ dopants.

The rare earth doped chalcogenide glasses exhibit an unusually strong PLE spectrum, as exhibited from the alternative rare earth dopants and chalcogenide glasses discussed above. Doping using Dysprosium (Dy) has also produced the broad absorption band. In the mechanism, it seems that excited states of trivalent dopant ions coincide with the band tail states and Urbach edge of the host chalcogenide glass. Applied in a pumping system in accordance with the present invention, a strong and flexible absorption band is excited by an excitation source to conduct very efficient optical pumping. Pumping efficiencies of the order of 75% should be obtained, as estimated from the known refractive index of the chalcogenide glass and the observed radiative lifetimes.

PLE spectrum information, considered as a whole, indicates that the glass formation and rare earth doping process introduces an additional broad continuous extrinsic absorption mechanism leading to the efficient excitation of characteristic dopant emission bands. Measured strength of the additional absorption mechanism in the 0.2% wt. $Er:Ge_{33}As_{12}Se_{55}$ at 855 nm is approximately $0.5cm^{-1}$, and at 730 nm is approximately $5cm^{-1}$. Contrasted with the low energy absorption tail with values from approximately 0.01 to 0.1 $cm^{-1}$ of curves 26 and 27 (FIG. 3) for pure $Ge_{33}As_{12}Se_{55}$ and $As_2S_3$, the efficiency added by the rare earth doping process is clear.

Referring again to FIG. 1, the excitation source therefore may be selected from pump lasers with a broad range of wavelengths, bright light emitting diodes and broad band pumping sources. In the case of an amplifier application, additional stimulated emission may be added to optical signal 10. However, other applications will be readily apparent adopting the pumping system of the present invention. As an example, the pumping system could be used in a single stage as shown in FIG. 1, or in multiple stages. In implementation of a laser source, optical signal 10 would not be directed into the chalcogenide glass, and the signal 18 would take the form of laser output light. Moreover, the advantageous physical properties of chalcogenides, including the ability to be formed in thin film form, will allow the chalcogenide glass stage of the pumping system to be implemented as a fiber or as part of an integrated circuit including a semiconductor pump laser as an excitation source.

Thin films of the doped chalcogenide could be sputtered onto semiconductor lasers and their substrates after fabrication of the pump lasers and associated drive circuits. Additionally, waveguides may be patterned in the chalcogenide thin film through a photodarkening process. In a laser application, holographic gratings written into the waveguides by photodarkening could serve as distributed Bragg reflectors to lock the planar waveguide laser formed from the glass and pump laser at a fixed wavelength within the gain spectrum of the rare-earth doped laser.

Many other applications and advantages will be apparent to those skilled in the art. Thus, while a particular embodiment of the present invention has been described, it will be appreciated by those skilled in the art that changes and modifications may be made thereto without departing from the invention in its broader aspects and as set forth in the following claims.

What is claimed is:

1. An optical pumping system comprising:

a chalcogenide glass;

a rare earth dopant within the chalcogenide glass; and an excitation source for exciting photoluminescence emissions in the chalcogenide glass, the chalcogenide glass having a continuous broad pumping absorption range which extends for approximately 400 nm, the excitation source subjecting the chalcogenide glass to pumping light anywhere throughout the continuous broad pumping absorption range of approximately 400 nm in width to excite said emissions.

2. An optical pumping system according to claim 1 wherein:

said range encompasses characteristic absorption peaks of said rare earth dopant.

3. An optical pumping system according to claim 2 wherein:

said characteristic absorption peaks are superimposed upon said range.

4. An optical pumping system according to claim 3 wherein:

said rare earth dopant is Erbium.

5. An optical pumping system according to claim 3 wherein:

said rare earth dopant is Praseodymium.

6. An optical pumping system according to claim 3 wherein:

plural rare earth dopants are within the chalcogenide glass; and said plural rare earth dopants are Erbium and Praseodymium.

7. An optical pumping system according to claim 1 wherein:

said range extends from approximately 600 to 1064 nm.

8. An optical pumping system according to claim 7 wherein:

said range includes a maximum peak centered at approximately 700 nm.

9. An optical pumping system according to claim 1, wherein:

said chalcogenide glass is $As_2S_3$.

10. An optical pumping system according to claim 9 wherein:

said rare earth dopant is Erbium.

11. An optical pumping system according to claim 10, wherein:

said Erbium is doped within said $As_2S_3$ to 0.2%.

12. An optical pumping system according to claim 9 wherein:

said rare earth dopant is Praseodymium.

13. An optical pumping system according to claim 9 wherein:

plural rare earth dopants are within the chalcogenide glass; and said plural rare earth dopants are Erbium and Praseodymium.

14. An optical pumping system according to claim 1, wherein:

said chalcogenide glass is $Ge_{33}As_{12}Se_{55}$.

15. An optical pumping system according to claim 14 wherein:

said rare earth dopant is Erbium.

16. An optical pumping system according to claim 15, wherein:

said Erbium is doped within said $Ge_{33}As_{12}Se_{55}$ to 0.2%.

17. An optical pumping system according to claim 15 wherein:

said rare earth dopant is Praseodymium.

18. An optical pumping system according to claim 15 wherein:

plural rare earth dopants are within the chalcogenide glass; and said plural rare earth dopants are Erbium and Praseodymium.

19. An optical pumping system according to claim 1, wherein:

said range is within a weak impurity absorption tail of the chalcogenide glass which overlaps characteristic absorption transitions of the rare earth.

20. An optical pumping system comprising:

an optical signal generator that generates optical signals;

an optical transmission medium receiving said optical signals and transmitting the optical signals over distance; and an optical amplifier disposed within the optical transmission medium at a predetermined distance from the optical signal generator, said amplifier receiving said optical signals and amplifying the signals, said amplifier including, a chalcogenide glass, a rare earth dopant within the chalcogenide glass, the chalcogenide glass having a continuous broad pumping absorption range which extends from approximately 600–1064 nm, and an excitation source for adding stimulated emission to the optical signal by subjecting the chalcogenide glass to pumping light, the chalcogenide glass absorbing said pumping light anywhere throughout the continuous broad pumping absorption range extending from approximately 600–1064 nm.

21. An optical pumping system according to claim 20 wherein:

said chalcogenide glass and said excitation source are combined in an integrated circuit.

22. An optical pumping system according to claim 20 wherein:

said range encompasses characteristic absorption peaks of said rare earth dopant.

23. An optical pumping system according to claim 22 wherein:

plural rare earth dopants are within the chalcogenide glass; and said plural rare earth dopants are Erbium and Praseodymium.

24. An optical pumping system according to claim 20 wherein:

said characteristic absorption peaks are superimposed upon said broad absorption range.

25. An optical pumping system according to claim 20 wherein:

said rare earth dopant is Erbium.

26. An optical pumping system according to claim 25 wherein:

said rare earth dopant is Praseodymium.

27. An optical pumping system according to claim 20, wherein:

said excitation source is a light emitting diode.

28. An optical pumping system according to claim 20, wherein:

said excitation source is a semiconductor laser.

29. An optical pumping system according to claim 20, further comprising:

receiver means for receiving and decoding the optical signal after additional stimulated emission has been added.

30. An optical pumping system according to claim 20, wherein:

said range is within a weak impurity absorption tail of the chalcogenide glass which overlaps characteristic absorption transitions of the rare earth.

31. An optical pumping system comprising:

a rare earth doped chalcogenide glass in which absorption transitions may be induced anywhere throughout a continuous broad pumping absorption range of excitation light wavelengths, said broad pumping absorption range extending for approximately 400 nm;

an excitation source subjecting said chalcogenide glass to photoluminescence excitation anywhere throughout the broad pumping absorption range, wherein said absorption transitions cause the excitation of rare earth dopants within the chalcogenide glass to a higher energy level and lifetimes of absorption induced electron occupation at said higher energy level is the approximate range of 0.25 to 2 ms.

32. An optical pumping system according to claim 31, wherein:

said range is within a weak impurity absorption tail of the chalcogenide glass which overlaps characteristic absorption transitions of the rare earth.

* * * * *

UNITED STATES PATENT AND TRADEMARK OFFICE
CERTIFICATE OF CORRECTION

PATENT NO. : 5,629,953
DATED : May 13, 1997
INVENTOR(S) : Bishop et al.

It is certified that error appears in the above-indentified patent and that said Letters Patent is hereby corrected as shown below:

On the Title Page:

Under "[57] References" for "Other Publications" delete "As S" and insert --$As_2S_3$--.

Under "[57] Abstract" delete "of4" and insert --of--.

Under "[57] Abstract" delete "$S_{55}$" and insert --$Se_{55}$--.

Column 1, line 40, delete "in a" and insert --in an--.

Column 5, line 24, after "0.25" and insert --ms--.

UNITED STATES PATENT AND TRADEMARK OFFICE
CERTIFICATE OF CORRECTION

PATENT NO. : 5,629,953
DATED : May 13, 1997
INVENTOR(S) : Bishop et al.

It is certified that error appears in the above-indentified patent and that said Letters Patent is hereby corrected as shown below:

Column 5, line 33, after "FIG. 1 is" and insert --a--.

Column 5, line 44, delete "$AS_2s_3$" and insert --$As_2S_3$--.

Column 5, line 48, delete "$Se_5$" and insert --$Se_{55}$--.

Column 6, line 4, delete "14" and insert --12--.

Column 6, line 21, delete "14" and insert --12--.

Column 6, line 24, delete "14" and insert --12-- (both occurrences).

Column 6, line 25, delete "16" and insert --14--.

Column 6, line 65, after "absorption" and insert --of--.

Column 8, line 27, delete "crystallinc" and insert -- crystalline--.

Column 8, line 32, delete "marking" and insert --making--.

UNITED STATES PATENT AND TRADEMARK OFFICE
CERTIFICATE OF CORRECTION

PATENT NO. : 5,629,953
DATED : May 13, 1997
INVENTOR(S) : Bishop et al.

It is certified that error appears in the above-indentified patent and that said Letters Patent is hereby corrected as shown below:

Column 8, line 65, delete "Photoluminescence" and insert --photoluminescence--.

Column 9, line 37, delete "AS$_2$S$_3$" and insert --As$_2$S$_3$--.

Column 9, line 39, delete "source" and insert --14--.

Signed and Sealed this

Sixth Day of October, 1998

Attest:

BRUCE LEHMAN

*Attesting Officer*      Commissioner of Patents and Trademarks